United States Patent
Asahi et al.

(10) Patent No.: US 10,767,236 B2
(45) Date of Patent: Sep. 8, 2020

(54) METHOD OF PRODUCING SUGAR SOLUTION

(71) Applicant: Toray Industries, Inc., Tokyo (JP)

(72) Inventors: Yuka Asahi, Kamakura (JP); Atsushi Minamino, Kamamura (JP); Jumpei Kishimoto, Iyo-gun (JP); Masashi Higasa, Kamakura (JP)

(73) Assignee: Toray Industries, Inc., Tokyo (JP)

( * ) Notice: Subject to any disclaimer, the term of this patent is extended or adjusted under 35 U.S.C. 154(b) by 2 days.

(21) Appl. No.: 15/116,374

(22) PCT Filed: Jan. 29, 2015

(86) PCT No.: PCT/JP2015/052529
§ 371 (c)(1),
(2) Date: Aug. 3, 2016

(87) PCT Pub. No.: WO2015/119038
PCT Pub. Date: Aug. 13, 2015

(65) Prior Publication Data
US 2017/0058369 A1    Mar. 2, 2017

(30) Foreign Application Priority Data
Feb. 5, 2014 (JP) ................................ 2014-020055

(51) Int. Cl.
| C13K 1/04 | (2006.01) |
| B01D 61/02 | (2006.01) |
| B01D 65/02 | (2006.01) |
| B01D 61/14 | (2006.01) |

(52) U.S. Cl.
CPC .............. *C13K 1/04* (2013.01); *B01D 61/022* (2013.01); *B01D 61/025* (2013.01); *B01D 61/027* (2013.01); *B01D 61/145* (2013.01); *B01D 65/02* (2013.01); *B01D 2321/162* (2013.01); *B01D 2321/164* (2013.01); *B01D 2325/34* (2013.01)

(58) Field of Classification Search
CPC ................................ C13K 1/04; B01D 61/022
USPC ........................................................ 127/54
See application file for complete search history.

(56) References Cited

U.S. PATENT DOCUMENTS

| 2005/0056600 A1 | 3/2005 | Ranney | |
| 2007/0289924 A1* | 12/2007 | Siegel .................. | B01D 61/025 210/636 |
| 2011/0250637 A1* | 10/2011 | Kurihara .............. | B01D 61/022 435/41 |
| 2013/0312738 A1* | 11/2013 | Kishimoto ........... | B01D 61/025 127/42 |

FOREIGN PATENT DOCUMENTS

| JP | 08-289687 A | | 11/1996 |
| JP | 10-304900 A | | 11/1998 |
| JP | 2003-236350 A | | 8/2003 |
| JP | 2003-259900 A | | 9/2003 |
| WO | 2010/067785 A1 | | 6/2010 |
| WO | WO2010/067785 | * | 6/2010 |
| WO | 2012/111794 A1 | | 8/2012 |
| WO | WO2012/111794 | * | 8/2012 |
| WO | 2013/083623 A1 | | 6/2013 |
| WO | 2013/183617 A1 | | 12/2013 |
| WO | 2014/024952 A1 | | 2/2014 |
| WO | 2014/024954 A1 | | 2/2014 |
| WO | WO2014/132069 | * | 9/2014 |

OTHER PUBLICATIONS

Expanding issues in desalination; Chapter 3 Membrane cleaning J.M. Arnal pp. 63-84, Sep. 2011.*
Membrane Cleaning Jose Miguel Arnal et al. Expanding Issues in Desalination, Chapter 3, pp. 64-84 (Year: 2011).*
Ecolab Safety Data Sheet—Ultrasil 110 pp. 1-11 downloaded Mar. 1, 2019 (Year: 2018).*
Xylose recovery by nanofiltration from different hemicellulose hydrolyzate feeds Elina Sjoman et al Journal of Membrane Science, vol. 310, pp. 268-277 (Year: 2008).*
European Communication dated Jul. 5, 2018, of corresponding European Application No. 15746666.5.
European Communication dated Aug. 8, 2019, of counterpart European Application No. 15746666.5.

* cited by examiner

*Primary Examiner* — Douglas B Call
(74) *Attorney, Agent, or Firm* — DLA Piper LLP (US)

(57) ABSTRACT

A method of producing a sugar liquid includes a step of filtering a saccharified liquid derived from cellulose-containing biomass, through a nanofiltration membrane and/or reverse osmosis membrane; and a two-step washing step of washing the nanofiltration membrane and/or reverse osmosis membrane after the filtration, with an acid washing liquid and then with an alkali washing liquid; is provided. The method of producing a sugar liquid in which a cellulose-derived sugar liquid is processed through a nanofiltration membrane and/or reverse osmosis membrane is/are effectively washed in a contaminated separation membrane(s).

12 Claims, 2 Drawing Sheets

[Fig. 1]
[Fig. 2]
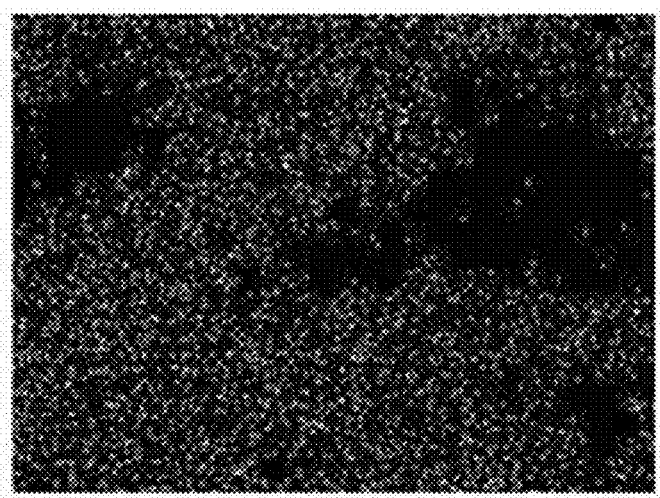

[Fig. 3]
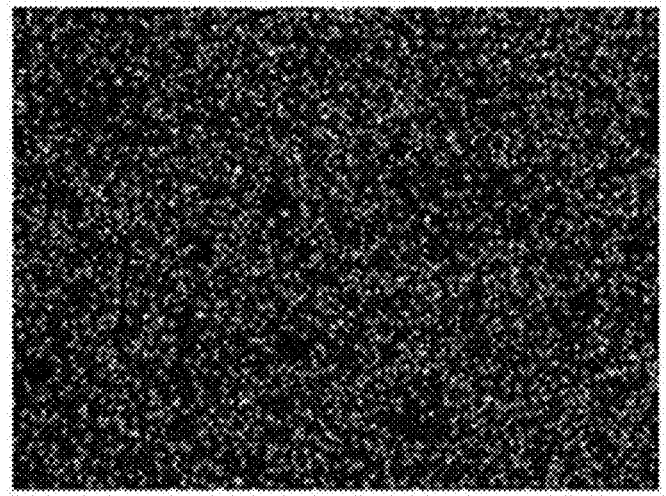
[Fig. 4]
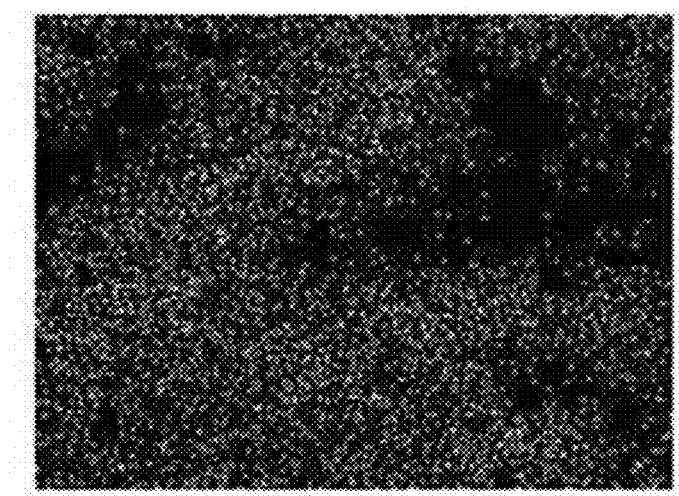

METHOD OF PRODUCING SUGAR SOLUTION

TECHNICAL FIELD

This disclosure relates to a method of producing a sugar liquid from cellulose.

BACKGROUND

In recent years, because of problems such as global warming and depletion of petroleum resources, and from the viewpoint of carbon neutrality, use of biomass as an alternative to petroleum products has been attracting attention. In particular, production of ethanol and chemical products from non-edible cellulose-containing biomass, which does not compete with food, has been expected.

For production of ethanol and chemical products from cellulose-containing biomass, monosaccharides produced by hydrolysis of cellulose and hemicellulose, which are polysaccharides, in the biomass are used to perform fermentation. Sugar liquids derived from cellulose-containing biomass contain, in addition to sugars, fermentation-inhibiting substances. Decreases in the yields of fermentation products due to such fermentation-inhibiting substances have been problematic.

As a method of removing the fermentation-inhibiting substances while concentrating the sugars to obtain a purified sugar liquid suitable for fermentation, a method in which a nanofiltration membrane and/or reverse osmosis membrane is/are used, wherein the fermentation-inhibiting substances are removed from the permeate side of the membrane(s), is known (WO 2010/067785).

As a method of washing an ultrafiltration membrane, nanofiltration membrane, or reverse osmosis membrane to remove its fouling, thereby efficiently removing fermentation-inhibiting substances, a method in which warm water with a high pH is used for effective washing is known (WO 2012/111794).

However, in the method of WO 2010/067785, long-term operation causes fouling of the membrane(s), which is problematic.

WO 2012/111794 describes alkali washing in which alkaline warm water is used to increase the effect to remove organic substances. However, this method was found to be problematic since, even when sufficient washing can be achieved by alkali washing of an ultrafiltration membrane after filtration treatment of a saccharified liquid derived from cellulose-containing biomass, a similar effect cannot necessarily be obtained for a nanofiltration membrane or a reverse osmosis membrane, and repeated use of such a membrane causes a decrease in the washing effect.

This is thought to be due to the fact that nanofiltration membranes and reverse osmosis membranes, unlike ultrafiltration membranes, cause concentration of inorganic ions derived from cellulose-containing biomass in the primary side, and that the concentrated inorganic ions act as fouling substances. It is generally known that, after processing of a solution containing a large amount of organic substances using a membrane, the membrane may be subjected to alkali washing and then acid washing. However, no washing effect could be obtained for nanofiltration membranes and reverse osmosis membranes after processing of a saccharified liquid derived from cellulose-containing biomass.

It could therefore be helpful to provide a method of obtaining a purified sugar liquid by removal of fermentation-inhibiting substances from a saccharified liquid derived from cellulose-containing biomass, using a nanofiltration membrane and/or reverse osmosis membrane, wherein fouling of the membrane(s) generated by the influence of organic substances and inorganic ions is removed by washing, thereby enabling repeated use of the membrane(s) and efficient removal of the fermentation-inhibiting substances.

SUMMARY

We thus provide:

A method of producing a sugar liquid, the method comprising:
 a step of filtering a saccharified liquid derived from cellulose-containing biomass, through a nanofiltration membrane and/or reverse osmosis membrane; and
 a two-step washing step of washing the nanofiltration membrane and/or reverse osmosis membrane after the filtration, with an acid washing liquid and then with an alkali washing liquid.

Preferably, the method of producing a sugar liquid comprises a water washing step before the two-step washing step.

Preferably, in the method of producing a sugar liquid, the saccharified liquid is filtered through an ultrafiltration membrane to obtain a filtrate, and the filtrate is subjected to the step of filtration through a nanofiltration membrane and/or reverse osmosis membrane.

Preferably, in the method of producing a sugar liquid, the molecular weight cutoff of the ultrafiltration membrane is not more than 50,000.

Preferably, in the method of producing a sugar liquid, the saccharified liquid contains calcium.

Preferably, in the method of producing a sugar liquid, the pH of the acid washing liquid is not more than 3.

Preferably, in the method of producing a sugar liquid, the acid washing liquid contains one or more selected from the group consisting of nitric acid, sulfuric acid, citric acid, phosphoric acid, lactic acid, and acetic acid.

Preferably, in the method of producing a sugar liquid, the pH of the alkali washing liquid is not less than 9.

Preferably, in the method of producing a sugar liquid, the alkali washing liquid contains one or more selected from the group consisting of sodium hydroxide, potassium hydroxide, and ammonia.

Preferably, in the method of producing a sugar liquid, the two-step washing step is repeatedly carried out.

Fouling of nanofiltration membranes and reverse osmosis membranes due to impurities specific to saccharified liquids derived from cellulose-containing biomass can be removed.

BRIEF DESCRIPTION OF THE DRAWINGS

FIG. 1 is an SEM image showing precipitates causing fouling of a reverse osmosis membrane, which image was taken after alkali washing.

FIG. 2 is a mapped image obtained by SEM-energy dispersive X-ray spectroscopy (hereinafter referred to as SEM-EDX) showing the distribution of calcium in precipitates causing fouling of a reverse osmosis membrane, which image was taken after alkali washing.

FIG. 3 is a mapped image obtained by SEM-EDX showing the distribution of carbon in precipitates causing fouling of a reverse osmosis membrane, which image was taken after alkali washing.

FIG. 4 is a mapped image obtained by SEM-EDX showing the distribution of oxygen in precipitates causing fouling of a reverse osmosis membrane, which image was taken after alkali washing.

DETAILED DESCRIPTION

The saccharified liquid means a liquid component obtained by hydrolysis of cellulose-containing biomass such as woody or herbaceous biomass. The method of hydrolysis of the cellulose-containing biomass is not limited. The method is preferably enzymatic saccharification of a cellulose-containing biomass pretreated by steam explosion treatment, hydrothermal treatment, acid treatment, alkali treatment, and/or ammonia treatment.

The saccharified liquid is filtered through a nanofiltration membrane and/or reverse osmosis membrane to remove fermentation inhibitors, thereby producing a sugar liquid. The filtration of the saccharified liquid may be carried out according to the method described in WO 2010/067785. The nanofiltration membrane/reverse osmosis membrane may also be those described in WO 2010/067785.

When a saccharified liquid derived from cellulose-containing biomass is filtered through a nanofiltration membrane and/or reverse osmosis membrane, long-term use of the separation membrane(s) causes fouling of the membrane(s) due to organic substances and inorganic ions that are impurities contained in the saccharified liquid. Our methods are characterized in that fouling of the membrane(s) is removed by two-step washing in which acid washing is carried out followed by alkali washing. On the other hand, the effect obtained cannot be obtained by acid washing or alkali washing alone, or by two-step washing in which alkali washing is carried out followed by acid washing.

The acid washing or the alkali washing means a process in which an acidic aqueous solution (hereinafter referred to as acid washing liquid) or an alkaline aqueous solution (hereinafter referred to as alkali washing liquid) is brought into contact with a membrane, and the acidic aqueous solution or the alkaline aqueous solution is then removed using water. Removal of the acid washing liquid or the alkali washing liquid is preferably confirmed by observation of a neutral pH of the water. The acid washing liquid or the alkali washing liquid may be allowed to flow only in the primary side (non-permeate side) of the membrane; may be allowed to flow such that cross flow filtration is performed from the primary side (non-permeate side) to the secondary side (permeate side) of the membrane; or may be placed such that the membrane is immersed therein. The acid washing liquid or the alkali washing liquid is preferably allowed to flow such that cross flow filtration is performed from the primary side (non-permeate side) to the secondary side (permeate side) of the membrane.

Preferred examples of the acid to be used for the acid washing liquid include: inorganic acids such as nitric acid, sulfuric acid, and phosphoric acid; and organic acids such as citric acid, lactic acid, and acetic acid. These acids may be used individually, or as a mixture of two or more thereof.

The pH of the acid washing liquid is preferably not more than 3, and is more preferably 2. This is because the lower the pH of the acid washing liquid, the higher the washing effect, while acid washing at a pH lower than 2 may cause deterioration of the membrane. Since the pHs at which the membrane can be washed vary depending on the type of the membrane, the membrane needs to be washed at a pH suitable for the membrane.

Preferred examples of the alkali to be used for the alkali washing liquid include sodium hydroxide, potassium hydroxide, and ammonia. These alkalis may be used individually, or as a mixture of two or more thereof.

The pH of the alkali washing liquid is preferably not less than 9, and is more preferably 12. This is because the higher the pH of the alkali washing liquid, the higher the washing effect, while alkali washing at a pH higher than 12 may cause deterioration of the membrane. Since the pHs at which the membrane can be washed vary depending on the type of the membrane, the membrane needs to be washed at a pH suitable for the membrane.

The operation before the two-step washing by the acid washing and the alkali washing is not limited. Although the two-step washing may be carried out directly after the filtration of the saccharified liquid, it is preferred to carry out water washing before the two-step washing. When the water washing is carried out in advance, mixing of the sugar liquid with the acid, which leads to acidification of the sugar liquid and hence to insolubilization of organic substances therein, causing occurrence of further fouling, can be prevented. Moreover, the water washing can be expected to be effective for removal of organic substances on the membrane surface.

Repeating of the two-step washing a plurality of times is also a preferred example from the viewpoint of increasing the washing effect.

The washing effect can be evaluated by comparison of the pure water flux of the unused membrane with the pure water flux of the fouled membrane, and with the pure water flux of the membrane after washing. That is, the value calculated by dividing the pure water flux of the fouled membrane or the membrane after washing by the pure water flux of the unused membrane is defined as the pure water flux ratio (%), and used for evaluation of the degree of recovery by the washing. When the membrane is recovered by the washing to show the same conditions as those of the unused membrane, the pure water flux ratio (%) is 100%. When a pure water flux ratio of not less than 80% could not be achieved after the recovery, each case was regarded as impractical because of low processing speed.

In some cases, the saccharified liquid contains a water-insoluble component such as a solid component. In such cases, the water-insoluble component is preferably removed by solid-liquid separation before the filtration step. Examples of the method of the solid-liquid separation of the saccharified liquid include filter press, centrifugation, and filtration through a microfiltration membrane. Since filtration through a microfiltration membrane enables removal of even micron-sized water-insoluble components, the cellulose-derived saccharified liquid is preferably subjected to filtration through a microfiltration membrane in advance, in addition to the later filtration through a separation membrane(s). The microfiltration membrane may be the one described in WO 2010/067785.

The saccharified liquid is preferably a filtrate obtained by filtration through an ultrafiltration membrane. The molecular weight cutoff of the ultrafiltration membrane is more preferably not more than 50,000. The ultrafiltration membrane means a membrane having a molecular weight cutoff of 1,000 to 200,000, and is referred to as an ultrafiltration, UF membrane, or the like for short. Since the pore size of an ultrafiltration membrane is too small, measurement of the pore size on its membrane surface is difficult even under the electron microscope or the like. Therefore, a value called the molecular weight cutoff is used as an index of the pore size instead of the average pore size. According to the Membrane Society of Japan ed., Membrane Experiment Series, Vol. III, Artificial Membrane, editorial committee members: Shoji Kimura, Shin-ichi Nakao, Haruhiko Ohya, and Tsutomu Nakagawa (1993, Kyoritsu Shuppan Co., Ltd.), p. 92, "The curve obtained by plotting the molecular weight of the solute along the abscissa and the blocking rate along the ordinate is called the molecular weight cutoff curve. The molecular weight with which the blocking rate reaches 90% is called the molecular weight cutoff of the membrane." Thus, the molecular weight cutoff is well known to those skilled in the art as an index representing the membrane performance of an ultrafiltration membrane. This is because high-molecular-weight components such as proteins derived from the cellulose-containing biomass in the saccharified liquid, and enzymes added for enzymatic saccharification, are removed, leading to a decrease in the amount of substances that undergo denaturation by the acid. In particular, an ultrafiltration membrane having a molecular weight cutoff of not more than 50,000, enzymes used for enzymatic saccharification can be easily removed, and a high washing effect can therefore be obtained. The ultrafiltration membrane is not limited, and may be, for example, the one used in WO 2010/067785.

The saccharified liquid preferably contains calcium. The term "contains calcium" means that calcium ions are detected by high-performance liquid chromatography (hereinafter referred to as HPLC). When the saccharified liquid contains calcium, the acid washing acts more effectively. When the cellulose-containing biomass contains calcium, the resulting saccharified liquid usually contains calcium. However, when the cellulose-containing biomass is subjected to treatment such as washing with water after pretreatment for the saccharification treatment, a calcium-free saccharified liquid is obtained in some cases.

EXAMPLES

Reference Example 1: Method of Measuring Calcium Concentration

The calcium concentration was quantified under the following HPLC conditions based on comparison with standard samples:
 Column: Ion Pac CS12A (manufactured by DIONEX)
 Mobile phase: 20 mM methanesulfonic acid (flow rate: 1.0 mL/min.)
 Reaction liquid: none
 Detection method: electric conductivity (by use of a suppressor)
 Temperature: 30° C.

Reference Example 2: Method of Preparing Steam Explosion-Treated Rice Hull Saccharified Liquid As a cellulose-containing biomass, rice hull was used. Using a steam explosion apparatus (30-L reactor, manufactured by Nihon Dennetsu Co., Ltd.), 2 kg of rice hull was subjected to steam explosion treatment. In this treatment, the pressure was 2.5 MPa, and the processing time was 2.5 minutes. After measuring the moisture content of the steam explosion-treated rice hull, RO water was added such that the solid content concentration became 15% by weight in terms of the absolute-drying-processed biomass, followed by adding Accellerase DUET (manufactured by Danisco Japan) and allowing the reaction to proceed at 50° C. for 24 hours to perform saccharification.

The saccharified product was subjected to treatment using a filter press (manufactured by Yabuta Industries Co., Ltd.; MO-4) for separation and removal of undegraded cellulose and lignin, and then to filtration through a microfiltration membrane having a pore size of 0.22 μm for removal of micron-sized insoluble particles, thereby obtaining a saccharified liquid. The calcium ion concentration in the saccharified liquid was measured by the method of Reference Example 1. The results are shown in Table 1.

TABLE 1

|  | $Ca^{2+}$ mg/L |
| --- | --- |
| Reference Example 2 | 15 |
| Reference Example 3 | 0 |
| Reference Example 4 | 5 |
| Reference Example 5 | 280 |
| Reference Example 6 | 20 |

Reference Example 3: Method of Preparing Saccharified Liquid from Washed Steam Explosion-Treated Rice Hull The steam explosion-treated product of cellulose-containing biomass prepared by the method of Reference Example 2 was washed with water in an amount which is 10 times the weight of the biomass. RO water was added to the washed steam explosion-treated product such that the solid content concentration became 15% by weight, and Accellerase DUET (manufactured by Danisco Japan) was further added thereto, followed by allowing the reaction to proceed at 50° C. for 24 hours to perform saccharification treatment. Subsequently, the resulting product was subjected to filter press treatment and microfiltration membrane treatment in the same manner as in Reference Example 2, to obtain a saccharified liquid. The calcium ion concentration in the saccharified liquid was measured by the method of Reference Example 1. The results are shown in Table 1.

Reference Example 4: Method of Preparing Pulp Saccharified Liquid

The moisture content of sheet wet pulp (manufactured by Hyogo Pulp Co., Ltd.), which is unbleached kraft pulp of hardwood, was measured, and RO water was added thereto such that the solid content concentration became 5% in terms of the absolute dry weight. Sodium acetate buffer was then added thereto to adjust the pH to about 5, and Accellerase DUET (manufactured by Danisco Japan) was further added thereto, followed by allowing the reaction to proceed at 50° C. for 24 hours to perform saccharification.

The saccharified product was subjected to treatment using a filter press (manufactured by Yabuta Industries Co., Ltd.; MO-4) for separation and removal of undegraded cellulose and lignin, and then to filtration through a microfiltration membrane having a pore size of 0.22 μm for removal of micron-sized insoluble particles, thereby obtaining a saccharified liquid. The calcium ion concentration in the saccharified liquid was measured by the method of Reference Example 1. The results are shown in Table 1.

Reference Example 5: Method of Preparing Ammonia-Treated Bagasse Saccharified Liquid Bagasse was fed to a compact reactor (manufactured by Taiatsu Techno Corporation, TVS-N2 30 mL), and cooled with liquid nitrogen. To this reactor, ammonia gas was fed to immerse the sample completely in liquid ammonia. After closing the lid of the reactor, the reactor was left to stand at room temperature for about 15 minutes. Subsequently, treatment in an oil bath at 150° C. was carried out for 1 hour. Thereafter, the reactor was removed from the oil bath, and the ammonia gas was immediately leaked in a fume hood. Using a vacuum pump, the inside of the reactor was dried by reducing the pressure to 10 Pa. After measuring the moisture content of the ammonia-treated bagasse, RO water was added thereto such that the solid content concentration became 10% by weight in terms of the absolute dry weight. Accellerase DUET (manufactured by Danisco Japan) was added thereto, and the reaction was allowed to proceed at 50° C. for 24 hours to perform saccharification.

The saccharified product was subjected to treatment using a filter press (manufactured by Yabuta Industries Co., Ltd.; MO-4) for separation and removal of undegraded cellulose and lignin, and then to filtration through a microfiltration membrane having a pore size of 0.22 μm for removal of micron-sized insoluble particles, thereby obtaining a saccharified liquid. The calcium ion concentration in the saccharified liquid was measured by the method of Reference Example 1. The results are shown in Table 1.

Reference Example 6: Method of Preparing Dilute Sulfuric Acid-Treated Corn Cob Saccharified Liquid Corn cob (Nippon Walnut Co., Ltd.) was immersed in 1% dilute sulfuric acid, and subjected to autoclaving at 120° C. for 20 minutes. Thereafter, solid-liquid separation into the solution component and the solid component was carried out to obtain a dilute sulfuric acid-treated corn cob as the solid component. After measuring the moisture content of the dilute sulfuric acid-treated corn cob, RO water was added thereto such that the solid content concentration became 10% by weight in terms of the absolute dry weight. Accellerase DUET (manufactured by Danisco Japan) was added thereto, and the reaction was allowed to proceed at 50° C. for 24 hours to perform saccharification.

The saccharified product was subjected to treatment using a filter press (manufactured by Yabuta Industries Co., Ltd.; MO-4) for separation and removal of undegraded cellulose and lignin, and then to filtration through a microfiltration membrane having a pore size of 0.22 μm for removal of micron-sized insoluble particles, thereby obtaining a saccharified liquid. The calcium ion concentration in the saccharified liquid was measured by the method of Reference Example 1. The results are shown in Table 1.

Reference Example 7: Method of Preparing Ultrafiltration Membrane Filtrate of Saccharified Liquid of Cellulose-Containing Biomass A saccharified liquid of cellulose-containing biomass was subjected to cross-flow filtration through an ultrafiltration membrane at an operating temperature of 50° C., membrane surface linear velocity of 20 cm/sec., and permeation flux of 0.5 m/day, to prepare an ultrafiltration membrane filtrate.

Reference Example 8: Method of Preparing Fouled Ultrafiltration Membrane

About 20 L of a saccharified liquid was filtered through an ultrafiltration membrane under the same conditions as in Reference Example 7. When the operating pressure reached 0.3 MPa, the pressure was fixed. The filtration was then continued at the fixed pressure. The operation was stopped when the amount of the concentrated liquid in the non-permeate side decreased to 1/15 of the raw liquid. By this, a fouled ultrafiltration membrane was obtained.

Reference Example 9: Method of Preparing Fouled Nanofiltration Membrane/Reverse Osmosis Membrane A saccharified liquid was filtered through an ultrafiltration membrane under the conditions in Reference Example 7, and the resulting filtrate was subjected to filtration through a nanofiltration membrane or reverse osmosis membrane. The filtration was carried out at an operating temperature of 50° C., membrane surface linear velocity of 20 cm/sec., and permeation flux of 0.5 m/day. When the operating pressure reached 6 MPa, the pressure was fixed. The filtration was then continued at the fixed pressure. The operation was stopped when the permeation flux decreased to 0.05 m/day. By this, a fouled membrane was obtained.

Reference Example 10: Method of Preparing Fouled Membrane of Flat Sheet Membrane A flat sheet membrane was cut out of a spiral element of a nanofiltration membrane. For the membrane processing, a membrane separation apparatus "SEPA CF II" (effective membrane area, 140 $cm^2$; manufactured by GE Osmonics) was used. Filtration of a saccharified liquid was carried out at an operating temperature of 30° C., membrane surface linear velocity of 20 cm/sec., and permeation flux of 0.5 m/day. When the operating pressure reached 6 MPa, the pressure was fixed. The filtration was then continued at the fixed pressure. The operation was stopped when the permeation flux decreased to 0.05 m/day. By this, a fouled membrane was obtained.

Reference Example 11: Method of Measuring Pure Water Flux

The pure water flux of an ultrafiltration membrane, nanofiltration membrane, or reverse osmosis membrane was measured by cross flow filtration of pure water at an operating temperature of 25° C. and a membrane surface linear velocity of 20 cm/sec., wherein the operating pressure was 0.1 MPa in an ultrafiltration membrane, or 1 MPa in cases of a nanofiltration membrane or reverse osmosis membrane.

Reference Example 12: Calculation of Pure Water Flux Ratio %

By the method of Reference Example 11, the pure water flux was measured for an unused membrane, fouled membrane before washing, and fouled membrane after washing. By calculating the pure water flux ratio % by comparison with the pure water flux of the unused membrane, the degree of fouling and the degree of recovery from fouling were evaluated. Equation (1) shows the method of calculating the pure water flux ratio %:

Pure water flux ratio %=pure water flux of fouled membrane/pure water flux of unused membrane×100 (1).

Example 1: Acid Washing and Alkali Washing of Nanofiltration Membrane and Reverse Osmosis Membrane after Processing of Steam Explosion-Treated Rice Hull Saccharified Liquid By the method of Reference Example 7, a steam explosion-treated rice hull saccharified liquid was filtered through an ultrafiltration membrane ("SPE30," manufactured by Synder; molecular weight cutoff, 30,000). Using the resulting filtrate, a fouled membrane of a nanofiltration membrane ("FR60-2514," manufactured by ROPUR) or a reverse osmosis membrane ("FRH-2514," manufactured by ROPUR) was prepared by the method of Reference Example 9. This fouled membrane was washed with water, and subjected to acid washing using an acidic aqueous solution at pH 2 (Washing Liquid 1), and then to alkali washing using an aqueous sodium hydroxide solution at pH 12 (Washing Liquid 2).

As the acid for the acidic aqueous solution, one of three kinds of acids, nitric acid, citric acid, or lactic acid, was used. Cross flow filtration was carried out for both the acidic aqueous solution and the aqueous sodium hydroxide solution at an operating temperature of 50° C. and a membrane surface linear velocity of 20 cm/sec., utilizing the discharge pressure of a pump. The acid washing was carried out for 60 minutes, and the alkali washing was carried out for 30 minutes, while the filtrate was returned to the supply tank (Washing 1). Thereafter, fouling was caused by the method of Reference Example 9, and the same washing was carried out again (Washing 2). That is, a total of two times of washing was carried out. By the method of Reference Example 11, the pure water flux was measured for the unused membrane, the fouled membranes before and after Washing 1, and the fouled membrane after Washing 2. Thereafter, the pure water flux ratio % was calculated by the method of Reference Example 12 for evaluation of the effect of each of Washing 1 and 2. The results are shown in Table 2. In Washing 1, both the nanofiltration membrane and the reverse osmosis membrane showed pure water flux ratios % of not less than 95%. Thus, the permeation flux was recovered to almost the same levels as that of the unused membrane. Further, a similar effect was maintained in Washing 2. Among the acidic aqueous solutions, the aqueous nitric acid solution had the highest washing effect.

Reference Example 13: Alkali Washing of Ultrafiltration Membrane after Processing of Steam Explosion-Treated Rice Hull Saccharified Liquid A fouled membrane of an ultrafiltration membrane ("SPE30," manufactured by Synder; molecular weight cutoff, 30,000) prepared using a steam explosion-treated rice hull saccharified liquid by the method of Reference Example 8 was washed with water, and subjected to washing using an aqueous sodium hydroxide solution at pH 12 (Washing Liquid 1). Cross flow filtration was carried out at an operating temperature of 50° C. and a membrane surface linear velocity of 20 cm/sec., utilizing the discharge pressure of a pump. The washing was carried out for 30 minutes by the total circulation operation while the filtrate was returned to the supply tank. The pure water flux was evaluated in the same manner as in Example 1. The results are shown in Table 2. While the pure water flux ratio % before the washing was 73%, the washing with sodium hydroxide allowed recovery of the ratio to 98%, which was almost equivalent to that of the unused membrane. The ratio after Washing 2 was 98%, indicating that the washing effect was maintained.

Comparative Example 1: Alkali Washing of Nanofiltration Membrane and Reverse Osmosis Membrane after Processing of Steam Explosion-Treated Rice Hull Saccharified Liquid By the method of Reference Example 7, a steam explosion-treated rice hull saccharified liquid was filtered through an ultrafiltration membrane ("SPE30," manufactured by Synder; molecular weight cutoff, 30,000). Using the resulting filtrate, a fouled membrane of a nanofiltration membrane ("FR60-2514," manufactured by ROPUR) or a reverse osmosis membrane ("FRH-2514," manufactured by ROPUR) was prepared by the method of Reference Example 9. This fouled membrane was washed with water, and subjected to washing using an aqueous sodium hydroxide solution at pH 12 (Washing Liquid 1). The washing and its evaluation were carried out in the same manner as in Example 1. As a result, as shown in Table 2, in Washing 1, both the nanofiltration membrane and the reverse osmosis membrane showed pure water flux ratios % of less than 80%, indicating low washing effects. In Washing 2, washing effects could be hardly obtained.

Reference Example 14: Observation of Membrane Surface of Reverse Osmosis Membrane after Alkali Washing Following Processing of Steam Explosion-Treated Rice Hull Saccharified Liquid Since the alkali washing, which was effective in the washing of the ultrafiltration membrane (Reference Example 13), was less effective in the washing of the spiral elements of the nanofiltration membrane and the reverse osmosis membrane (Comparative Example 1), the spiral element of the reverse osmosis membrane after the washing in Comparative Example 1 was decomposed, and the membrane surface was observed. As the method of the analysis, SEM-EDX was used (SEM, "S-4800" manufactured by Hitachi, Ltd.; EDX detection, "EMAX ENERGY EX-220" manufactured by Horiba, Ltd.) In the analysis, a voltage of 20 kV was applied. For prevention of charging of substances, the sample was subjected to sputtering of platinum for 5 seconds before the analysis. As shown in FIG. 1, fouling with precipitates was found on the membrane surface. As shown in FIGS. 2 to 4, the constituting components of the precipitates were calcium, carbon, and oxygen. It was thus assumed that the surface of the reverse osmosis membrane after the alkali washing was fouled with calcium carbonate.

Comparative Example 2: Acid Washing of Nanofiltration Membrane and Reverse Osmosis Membrane after Processing of Steam Explosion-Treated Rice Hull Saccharified Liquid By the method of Reference Example 7, a steam explosion-treated rice hull saccharified liquid was filtered through an ultrafiltration membrane ("SPE30," manufactured by Synder; molecular weight cutoff, 30,000). Using the resulting filtrate, a fouled membrane of a nanofiltration membrane ("FR60-2514," manufactured by ROPUR) or a reverse osmosis membrane ("FRH-2514," manufactured by ROPUR) was prepared by the method of Reference Example 9. This fouled membrane was washed with water, and then subjected to washing using an acidic aqueous solution at pH 2 (Washing Liquid 1). As the acid for the acidic aqueous solution, one of three kinds of acids, nitric acid, citric acid, or lactic acid, was used. The washing and its evaluation were carried out in the same manner as in Example 1. The results are shown in Table 2. Although better effects could be obtained for both the nanofiltration membrane and the reverse osmosis membrane compared to those in Comparative Example 1, the pure water flux ratios % were less than 80% in Washing 1, indicating insufficient washing effects. Moreover, in Washing 2, the washing effects remarkably decreased similarly to Comparative Example 1.

Comparative Example 3: Alkali Washing and Acid Washing of Nanofiltration Membrane and Reverse Osmosis Membrane after Processing of Steam Explosion-Treated Rice Hull Saccharified Liquid By the method of Reference Example 7, a steam explosion-treated rice hull saccharified liquid was filtered through an ultrafiltration membrane ("SPE30," manufactured by Synder; molecular weight cutoff, 30,000). Using the resulting filtrate, a fouled membrane of a nanofiltration membrane ("FR60-2514," manufactured by ROPUR) or a reverse osmosis membrane ("FRH-2514," manufactured by ROPUR) was prepared by the method of Reference Example 9. This fouled membrane was washed with water, and subjected to alkali washing using an aqueous sodium hydroxide solution at pH 12 (Washing Liquid 1), and then acid washing using an acidic aqueous solution at pH 2 (Washing Liquid 2). As the acid for the acid washing liquid, one of three kinds of acids, nitric acid, citric acid, or lactic acid, was used. The washing and its evaluation were carried out in the same manner as in Example 1. As a result, as shown in Table 2, in Washing 1, better effects could be obtained for both the nanofiltration membrane and the reverse osmosis membrane compared to those in Comparative Example 1. However, the pure water flux ratios % were less than 80%, indicating insufficient washing effects. Moreover, although the decreases in the washing effects of Washing 2 were smaller than those in Comparative Example 1, the washing effects could not be maintained.

liquid (without ultrafiltration membrane treatment) in Reference Example 2, a filtrate obtained by processing the steam explosion-treated rice hull saccharified liquid in Reference Example 2 through Ultrafiltration Membrane 1 ("UFpHt series GR40PP" manufactured by Alfa-Laval; molecular weight cutoff, 100,000), or a filtrate obtained by processing the steam explosion-treated rice hull saccharified liquid in Reference Example 2 through Ultrafiltration Membrane 2 ("UFpHt series GR51PP" manufactured by Alfa-Laval; molecular weight cutoff, 50,000) under the conditions in Reference Example 7. The three kinds of fouled membranes were washed with water, and subjected to acid washing with an aqueous nitric acid solution at pH 2 (Washing Liquid 1), and then to alkali washing using an aqueous sodium hydroxide solution at pH 12 (Washing

TABLE 2

| | Membrane | Washing Liquid 1 | Washing Liquid 2 | Pure Water Flux Ratio (%) | | |
|---|---|---|---|---|---|---|
| | | | | Before Washing | Washing 1 | Washing 2 |
| Reference Example 13 | Ultrafiltration Membrane | pH 12 Sodium hydroxide aqueous solution | | 73 | 98 | 98 |
| Comparative Example 1 | Nanofiltration Membrane | pH 12 Sodium hydroxide aqueous solution | | 43 | 63 | 46 |
| | Reverse Osmosis Membrane | pH 12 Sodium hydroxide aqueous solution | | 41 | 60 | 41 |
| Comparative Example 2 | Nanofiltration Membrane | pH 2 Nitric acid | | 45 | 76 | 52 |
| | Nanofiltration Membrane | pH 2 Citric acid | | 43 | 75 | 54 |
| | Nanofiltration Membrane | pH 2 Lactic acid | | 44 | 75 | 51 |
| | Reverse Osmosis Membrane | pH 2 Nitric acid | | 41 | 74 | 53 |
| | Reverse Osmosis Membrane | pH 2 Citric acid | | 42 | 74 | 50 |
| | Reverse Osmosis Membrane | pH 2 Lactic acid | | 40 | 73 | 50 |
| Comparative Example 3 | Nanofiltration Membrane | pH 12 Sodium hydroxide aqueous solution | pH 2 Nitric acid | 44 | 77 | 62 |
| | Nanofiltration Membrane | pH 12 Sodium hydroxide aqueous solution | pH 2 Citric acid | 45 | 77 | 62 |
| | Nanofiltration Membrane | pH 12 Sodium hydroxide aqueous solution | pH 2 Lactic acid | 42 | 76 | 61 |
| | Reverse Osmosis Membrane | pH 12 Sodium hydroxide aqueous solution | pH 2 Nitric acid | 41 | 75 | 60 |
| | Reverse Osmosis Membrane | pH 12 Sodium hydroxide aqueous solution | pH 2 Citric acid | 40 | 74 | 61 |
| | Reverse Osmosis Membrane | pH 12 Sodium hydroxide aqueous solution | pH 2 Lactic acid | 43 | 75 | 60 |
| Example 1 | Nanofiltration Membrane | pH 2 Nitric acid | pH 12 Sodium hydroxide aqueous solution | 45 | 98 | 98 |
| | Nanofiltration Membrane | pH 2 Citric acid | pH 12 Sodium hydroxide aqueous solution | 44 | 96 | 96 |
| | Nanofiltration Membrane | pH 2 Lactic acid | pH 12 Sodium hydroxide aqueous solution | 43 | 96 | 96 |
| | Reverse Osmosis Membrane | pH 2 Nitric acid | pH 12 Sodium hydroxide aqueous solution | 43 | 98 | 98 |
| | Reverse Osmosis Membrane | pH 2 Citric acid | pH 12 Sodium hydroxide aqueous solution | 42 | 96 | 96 |
| | Reverse Osmosis Membrane | pH 2 Lactic acid | pH 12 Sodium hydroxide aqueous solution | 44 | 96 | 96 |

Example 2: Influences of Ultrafiltration Membrane Treatment on Nanofiltration Membrane Washing and Reverse Osmosis Membrane Washing A fouled membrane of a nanofiltration membrane ("FR60-2514," manufactured by ROPUR) or a reverse osmosis membrane ("FRH-2514," manufactured by ROPUR) was prepared by the method of Reference Example 9. The preparation of the fouled membrane was carried out using the steam explosion-treated rice hull saccharified liquid 2). The washing and its evaluation were carried out in the same manner as in Example 1. The results are shown in Table 3. Based on comparison between our results and the results of Example 1, it was shown that processing of the saccharified liquid with an ultrafiltration membrane increases the effect of the two-step washing in which acid washing is carried out followed by alkali washing, and that processing with an ultrafiltration membrane with a molecular weight cutoff of not more than 50,000 further increases the effect of the two-step washing.

TABLE 3

| Membrane | Ultrafiltration Membrane | Washing Liquid 1 | Washing Liquid 2 | Pure Water Flux Ratio (%) | | |
|---|---|---|---|---|---|---|
| | | | | Before Washing | Washing 1 | Washing 2 |
| Nanofiltration Membrane | absent | pH 2 Nitric acid | pH 12 Sodium hydroxide aqueous solution | 33 | 81 | 81 |
| Nanofiltration Membrane | Ultrafiltration Membrane1 | pH 2 Nitric acid | pH 12 Sodium hydroxide aqueous solution | 35 | 84 | 83 |
| Nanofiltration Membrane | Ultrafiltration Membrane2 | pH 2 Nitric acid | pH 12 Sodium hydroxide aqueous solution | 38 | 98 | 98 |
| Reverse Osmosis Membrane | absent | pH 2 Nitric acid | pH 12 Sodium hydroxide aqueous solution | 30 | 81 | 80 |
| Reverse Osmosis Membrane | Ultrafiltration Membrane1 | pH 2 Nitric acid | pH 12 Sodium hydroxide aqueous solution | 34 | 83 | 81 |
| Reverse Osmosis Membrane | Ultrafiltration Membrane2 | pH 2 Nitric acid | pH 12 Sodium hydroxide aqueous solution | 37 | 98 | 98 |

Example 3: Washing Effects on Fouling of Nanofiltration Membrane and Reverse Osmosis Membrane in Cases where Saccharified Liquid does not Contain Calcium By the method of Reference Example 7, the saccharified liquid prepared in Reference Example 3 was filtered through an ultrafiltration membrane ("SPE30," manufactured by Synder; molecular weight cutoff, 30,000). Using the resulting filtrate, a fouled membrane of a nanofiltration membrane ("FR60-2514," manufactured by ROPUR) or a reverse osmosis membrane ("FRH-2514," manufactured by ROPUR) was prepared by the method of Reference Example 9. This fouled membrane was washed with water, and subjected to acid washing using an aqueous nitric acid solution at pH 2 (Washing Liquid 1), and then alkali washing using an aqueous sodium hydroxide solution at pH 12 (Washing Liquid 2). The washing and its evaluation were carried out in the same manner as in Example 1. As a result, as shown in Table 4, although the effects were rather lower than those in Example 1, the pure water flux ratios % exceeded 80%, indicating sufficient washing effects.

TABLE 4

| Membrane | $Ca^{2+}$ mg/L | Washing Liquid 1 | Washing Liquid 2 | Pure Water Flux Ratio (%) | | |
|---|---|---|---|---|---|---|
| | | | | Before Washing | Washing 1 | Washing 2 |
| Nanofiltration Membrane | 0 | pH 2 Nitric acid | pH 12 Sodium hydroxide aqueous solution | 43 | 84 | 85 |
| Reverse Osmosis Membrane | 0 | pH 2 Nitric acid | pH 12 Sodium hydroxide aqueous solution | 41 | 82 | 82 |

Example 4: Influences of Water Washing after Filtration of Saccharified Liquid on Washing of Nanofiltration Membrane and Reverse Osmosis Membrane By the method of Reference Example 1, a steam explosion-treated rice hull saccharified liquid was filtered through an ultrafiltration membrane ("SPE30," manufactured by Synder; molecular weight cutoff, 30,000). Using the resulting filtrate, a fouled membrane of a nanofiltration membrane ("FR60-2514," manufactured by ROPUR) or a reverse osmosis membrane ("FRH-2514," manufactured by ROPUR) was prepared by the method of Reference Example 8. Without water washing, this fouled membrane was subjected to acid washing with an aqueous nitric acid solution at pH 2 (Washing Liquid 1), and then alkali washing using an aqueous sodium hydroxide solution at pH 12 (Washing Liquid 2). The washing and its evaluation were carried out in the same manner as in Example 1. As a result, as shown in Table 5, washing effects could be obtained even without water washing after the filtration, although the effects were rather lower than those in Example 1.

TABLE 5

| Membrane | Washing Liquid 1 | Washing Liquid 2 | Pure Water Flux Ratio (%) | | |
|---|---|---|---|---|---|
| | | | Before Washing | Washing 1 | Washing 2 |
| Nanofiltration Membrane | pH 2 Nitric acid | pH 12 Sodium hydroxide aqueous solution | 43 | 85 | 85 |

TABLE 5-continued

| Membrane | Washing Liquid 1 | Washing Liquid 2 | Pure Water Flux Ratio (%) | | |
|---|---|---|---|---|---|
| | | | Before Washing | Washing 1 | Washing 2 |
| Reverse Osmosis Membrane | pH 2 Nitric acid | pH 12 Sodium hydroxide aqueous solution | 41 | 83 | 82 |

Example 5: Acid Washing and Alkali Washing of Reverse Osmosis Membrane after Processing of Pulp Saccharified Liquid By the method of Reference Example 7, a pulp saccharified liquid was filtered through an ultrafiltration membrane ("SPE30," manufactured by Synder; molecular weight cut-off, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to acid washing using an acidic aqueous solution at pH 2 (Washing Liquid 1), and then alkali washing using an aqueous sodium hydroxide solution at pH 12 (Washing Liquid 2).

As the acid for the acidic aqueous solution, nitric acid was used. Cross flow filtration was carried out for both the acidic aqueous solution and the aqueous sodium hydroxide solution at an operating temperature of 50° C. and a membrane surface linear velocity of 20 cm/sec., utilizing the discharge pressure of a pump. The acid washing was carried out for 60 minutes, and the alkali washing was carried out for 30 minutes, while the filtrate was returned to the supply tank (Washing 1). Thereafter, fouling was caused by the method of Reference Example 2, and the same washing was carried out again (Washing 2). That is, a total of two times of washing was carried out. By the method of Reference Example 11, the pure water flux was measured for the unused membrane, the fouled membranes before and after Washing 1, and the fouled membrane after Washing 2. Thereafter, the pure water flux ratio % was calculated by the method of Reference Example 12 for evaluation of the effect of each of Washing 1 and 2. The results are shown in Table 6. In Washing 1, the pure water flux ratio % exceeded 95%, indicating that the permeation flux was recovered to almost the same level as that of the unused membrane. Further, a similar effect was maintained in Washing 2.

Comparative Example 4: Alkali Washing of Reverse Osmosis Membrane after Processing of Pulp Saccharified Liquid By the method of Reference Example 7, a pulp saccharified liquid was filtered through an ultrafiltration membrane ("SPE30," manufactured by Synder; molecular weight cut-off, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to washing using an aqueous sodium hydroxide solution at pH 12 (Washing Liquid 1). The washing and its evaluation were carried out in the same manner as in Example 5. The results are shown in Table 6. In Washing 1, the pure water flux ratio % was less than 80%, indicating a low washing effect. In Washing 2, a washing effect could be hardly obtained.

Comparative Example 5: Acid Washing of Reverse Osmosis Membrane after Processing of Pulp Saccharified Liquid By the method of Reference Example 7, a pulp saccharified liquid was filtered through an ultrafiltration membrane ("SPE30," manufactured by Synder; molecular weight cut-off, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to washing using an acidic aqueous solution at pH 2 (Washing Liquid 1). As the acid for the acidic aqueous solution, nitric acid was used. The washing and its evaluation were carried out in the same manner as in Example 5. The results are shown in Table 6. In Washing 1, the pure water flux ratio % was less than 80%, indicating an insufficient washing effect. In Washing 2, the washing effect remarkably decreased.

TABLE 6

| | Membrane | Washing Liquid 1 | Washing Liquid 2 | Pure Water Flux Ratio (%) | | |
|---|---|---|---|---|---|---|
| | | | | Before Washing | Washing 1 | Washing 2 |
| Example 5 | Reverse Osmosis Membrane | pH 2 Nitric acid | pH 12 Sodium hydroxide aqueous solution | 45 | 96 | 96 |
| Comparative Example 4 | Reverse Osmosis Membrane | pH 12 Sodium hydroxide aqueous solution | | 44 | 65 | 45 |
| Comparative Example 5 | Reverse Osmosis Membrane | pH 2 Nitric acid | | 44 | 72 | 56 |
| Comparative Example 6 | Reverse Osmosis Membrane | pH 12 Sodium hydroxide aqueous solution | pH 2 Nitric acid | 43 | 76 | 65 |

Comparative Example 6: Alkali Washing and Acid Washing of Reverse Osmosis Membrane after Processing of Pulp Saccharified Liquid By the method of Reference Example 7, a pulp saccharified liquid was filtered through an ultrafiltration membrane ("SPE30," manufactured by Synder; molecular weight cutoff, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to alkali washing using an aqueous sodium hydroxide solution at pH 12 (Washing Liquid 1), and then to acid washing using an acidic aqueous solution at pH 2 (Washing Liquid 2). As the acid for the acid washing liquid, nitric acid was used. The washing and its evaluation were carried out in the same manner as in Example 5. The results are shown in Table 6. In Washing 1, the pure water flux ratio % was less than 80%, indicating an insufficient washing effect. Moreover, the washing effect could not be maintained.

Example 6: Acid Washing and Alkali Washing of Nanofiltration Membrane after Processing of Ammonia-Treated Bagasse Saccharified Liquid By the method of Reference Example 7, an ammonia-treated bagasse saccharified liquid was filtered through an ultrafiltration membrane ("SPE30," manufactured by Synder; molecular weight cutoff, 30,000). Using the resulting filtrate, a fouled membrane of a flat sheet membrane cut out of a nanofiltration membrane ("FR60-2514,", manufactured by ROPUR) was prepared by the method of Reference Example 10. This fouled membrane was washed with water, and subjected to acid washing using an acidic aqueous solution at pH 2 (Washing Liquid 1), and then alkali washing using an aqueous sodium hydroxide solution at pH 12 (Washing Liquid 2). The membrane separation apparatus "SEPA CF II" (effective membrane area, 140 cm$^2$; manufactured by GE Osmonics) was used also for the washing processes.

As the acid for the acidic aqueous solution, nitric acid was used. Cross flow filtration was carried out for both the acidic aqueous solution and the aqueous sodium hydroxide solution at an operating temperature of 50° C. and a membrane surface linear velocity of 20 cm/sec., utilizing the discharge pressure of a pump. The acid washing was carried out for 60 minutes, and the alkali washing was carried out for 30 minutes, while the filtrate was returned to the supply tank (Washing 1). Thereafter, fouling was caused by the method of Reference Example 10, and the same washing was carried out again (Washing 2). That is, a total of two times of washing was carried out. By the method of Reference Example 11, the pure water flux was measured for the unused membrane, the fouled membranes before and after Washing 1, and the fouled membrane after Washing 2. Thereafter, the pure water flux ratio % was calculated by the method of Reference Example 12 for evaluation of the effect of each of Washing 1 and 2. The results are shown in Table 7. In Washing 1, the pure water flux ratio % exceeded 95%, indicating recovery to almost the same level as that of the unused membrane. Further, a similar effect was maintained in Washing 2.

TABLE 7

|  | Membrane | Washing Liquid 1 | Washing Liquid 2 | Before Washing | Washing 1 | Washing 2 |
| --- | --- | --- | --- | --- | --- | --- |
| | | | | Pure Water Flux Ratio (%) | | |
| Example 6 | Nanofiltration Membrane | pH 2 Nitric acid | pH 12 Sodium hydroxide aqueous solution | 54 | 98 | 98 |
| Comparative Example 7 | Nanofiltration Membrane | pH 12 Sodium hydroxide aqueous solution | | 53 | 73 | 60 |
| Comparative Example 8 | Nanofiltration Membrane | pH 2 Nitric acid | | 52 | 66 | 60 |
| Comparative Example 9 | Nanofiltration Membrane | pH 12 Sodium hydroxide aqueous solution | pH 2 Nitric acid | 55 | 78 | 65 |

Comparative Example 7: Alkali Washing of Nanofiltration Membrane after Processing of Ammonia-Treated Bagasse Saccharified Liquid By the method of Reference Example 7, an ammonia-treated bagasse saccharified liquid was filtered through an ultrafiltration membrane ("SPE30," manufactured by Synder; molecular weight cutoff, 30,000). Using the resulting filtrate, a fouled membrane of a flat sheet membrane cut out of a nanofiltration membrane ("FR60-2514," manufactured by ROPUR) was prepared by the method of Reference Example 10. This fouled membrane was washed with water, and subjected to washing using an aqueous sodium hydroxide solution at pH 12 (Washing Liquid 1). The washing and its evaluation were carried out in the same manner as in Example 6. The results are shown in Table 7. In Washing 1, the pure water flux ratio % was less than 80%, indicating a low washing effect. Moreover, in Washing 2, a washing effect could be hardly obtained.

Comparative Example 8: Acid Washing of Reverse Osmosis Membrane after Processing of Ammonia-Treated Bagasse Saccharified Liquid By the method of Reference Example 7, an ammonia-treated bagasse saccharified liquid was filtered through an ultrafiltration membrane ("SPE30," manufactured by Synder; molecular weight cutoff, 30,000). Using the resulting filtrate, a fouled membrane of a flat sheet membrane cut out of a nanofiltration membrane ("FR60-2514," manufactured by ROPUR) was prepared by the method of Reference Example 10. This fouled membrane was washed with water, and subjected to washing using an acidic aqueous solution at pH 2 (Washing Liquid 1). As the acid for the acidic aqueous solution, nitric acid was used. The washing and its evaluation were carried out in the same manner as in Example 6. The results are shown in Table 7. In Washing 1, the pure water flux ratio % was less than 80%, indicating an insufficient washing effect. Moreover, in Washing 2, the washing effect remarkably decreased.

Comparative Example 9: Alkali Washing and Acid Washing of Nanofiltration Membrane after Processing of Ammonia-Treated Bagasse Saccharified Liquid By the method of Reference Example 7, an ammonia-treated bagasse saccharified liquid was filtered through an ultrafiltration membrane ("SPE30," manufactured by Synder; molecular weight cutoff, 30,000). Using the resulting filtrate, a fouled membrane of a flat sheet membrane cut out of a nanofiltration membrane ("FR60-2514," manufactured by ROPUR) was prepared by the method of Reference Example 10. This fouled membrane was washed with water, and subjected to alkali washing using an aqueous sodium hydroxide solution at pH 12 (Washing Liquid 1), and then acid washing using an acidic aqueous solution at pH 2 (Washing Liquid 2). As the acid for the acid washing liquid, nitric acid was used. The washing and its evaluation were carried out in the same manner as in Example 6. The results are shown in Table 7. In Washing 1, the pure water flux ratio % was less than 80%, indicating an insufficient washing effect. Moreover, in Washing 2, the washing effect remarkably decreased.

Example 7: Acid Washing and Alkali Washing of Reverse Osmosis Membrane after Processing of Dilute Sulfuric Acid-Treated Corn Cob Saccharified Liquid By the method of Reference Example 7, a dilute sulfuric acid-treated corn cob saccharified liquid was filtered through an ultrafiltration membrane ("SPE30," manufactured by Synder; molecular weight cutoff, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to acid washing using an acidic aqueous solution at pH 2 (Washing Liquid 1), and then alkali washing using an aqueous sodium hydroxide solution at pH 12 (Washing Liquid 2).

As the acid for the acidic aqueous solution, nitric acid was used. Cross flow filtration was carried out for both the acidic aqueous solution and the aqueous sodium hydroxide solution at an operating temperature of 50° C. and a membrane surface linear velocity of 20 cm/sec., utilizing the discharge pressure of a pump. The acid washing was carried out for 60 minutes, and the alkali washing was carried out for 30 minutes, while the filtrate was returned to the supply tank (Washing 1). Thereafter, fouling was caused by the method of Reference Example 9, and the same washing was carried out again (Washing 2). That is, a total of two times of washing was carried out. By the method of Reference Example 11, the pure water flux was measured for the unused membrane, the fouled membranes before and after Washing 1, and the fouled membrane after Washing 2. Thereafter, the pure water flux ratio % was calculated by the method of Reference Example 12 for evaluation of the effect of each of Washing 1 and 2. As a result, as shown in Table 8, the pure water flux ratio % exceeded 95% in Washing 1, indicating recovery to almost the same level of permeation flux as that of the unused membrane. Further, a similar effect was maintained in Washing 2.

TABLE 8

| | Membrane | Washing Liquid 1 | Washing Liquid 2 | Pure Water Flux Ratio (%) | | |
| --- | --- | --- | --- | --- | --- | --- |
| | | | | Before Washing | Washing 1 | Washing 2 |
| Example 8 | Reverse Osmosis Membrane | pH 2 Nitric acid | pH 12 Sodium hydroxide aqueous solution | 46 | 98 | 96 |
| Comparative Example 10 | Reverse Osmosis Membrane | pH 12 Sodium hydroxide aqueous solution | | 45 | 68 | 47 |
| Comparative Example 11 | Reverse Osmosis Membrane | pH 2 Nitric acid | | 45 | 70 | 54 |
| Comparative Example 12 | Reverse Osmosis Membrane | pH 12 Sodium hydroxide aqueous solution | pH 2 Nitric acid | 43 | 77 | 63 |

Comparative Example 10: Alkali Washing of Reverse Osmosis Membrane after Processing of Dilute Sulfuric Acid-Treated Corn Cob Saccharified Liquid By the method of Reference Example 7, a dilute sulfuric acid-treated corn cob saccharified liquid was filtered through an ultrafiltration membrane ("SPE30," manufactured by Synder; molecular weight cutoff, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to washing using an aqueous sodium hydroxide solution at pH 12 (Washing Liquid 1). The washing and its evaluation were carried out in the same manner as in Example 5. The results are shown in Table 8. In Washing 1, the pure water flux ratio % was less than 80%, indicating a low washing effect. In Washing 2, a washing effect could be hardly obtained.

Comparative Example 11: Acid Washing of Reverse Osmosis Membrane after Processing of Dilute Sulfuric Acid-Treated Corn Cob Saccharified Liquid By the method of Reference Example 7, a dilute sulfuric acid-treated corn cob saccharified liquid was filtered through an ultrafiltration membrane ("SPE30," manufactured by Synder; molecular weight cutoff, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to washing using an acidic aqueous solution at pH 2 (Washing Liquid 1). As the acid for the acidic aqueous solution, nitric acid was used. The washing and its evaluation were carried out in the same manner as in Example 7. The results are shown in Table 8. In Washing 1, the pure water flux ratio % was less than 80%, indicating an insufficient washing effect. Moreover, in Washing 2, the washing effect remarkably decreased.

Comparative Example 12: Alkali Washing and Acid Washing of Reverse Osmosis Membrane after Processing of Dilute Sulfuric Acid-Treated Corn Cob Saccharified Liquid By the method of Reference Example 7, a dilute sulfuric acid-treated corn cob saccharified liquid was filtered through an ultrafiltration membrane ("SPE30," manufactured by Synder; molecular weight cutoff, 30,000). Using the resulting filtrate, a fouled membrane of a reverse osmosis membrane ("FRH-2514," manufactured by ROPUR) was prepared by the method of Reference Example 9. This fouled membrane was washed with water, and subjected to alkali washing using an aqueous sodium hydroxide solution at pH 12 (Washing Liquid 1), and then acid washing using an acidic aqueous solution at pH 2 (Washing Liquid 2). As the acid for the acid washing liquid, nitric acid was used. The washing and its evaluation were carried out in the same manner as in Example 7. As a result, as shown in Table 8, better effects could be obtained in Washing 1 for the reverse osmosis membrane, compared to those in Comparative Example 1. However, the pure water flux ratio % was less than 80%, indicating an insufficient washing effect. Moreover, the washing effect could not be maintained.

INDUSTRIAL APPLICABILITY

The method of producing a sugar liquid provides a method of producing a sugar liquid, comprising a step of filtration through a nanofiltration membrane and/or reverse osmosis membrane, wherein fouling of the membrane(s) caused by the influence of organic substances and inorganic ions is removed by washing. Thus, the membrane(s) can be repeatedly used, and a purified sugar liquid can be efficiently obtained.

The invention claimed is:

1. A method of producing a sugar liquid comprising:
a step of filtering a saccharified liquid obtained by at least one selected from the group consisting of a) enzymatic saccharification of a cellulose-containing biomass pretreated by steam explosion treatment, b) hydrothermal treatment, c) acid treatment, d) alkali treatment, and e) ammonia treatment, through a nanofiltration membrane; and
a two-step washing step consisting of washing said nanofiltration membrane after said filtration, with nitric acid and then with an alkali washing liquid.

2. The method according to claim 1, further comprising a water washing step before said two-step washing step.

3. The method according to claim 2, wherein said saccharified liquid contains calcium.

4. The method according to claim 2, wherein said saccharified liquid is filtered through an ultrafiltration membrane to obtain a filtrate, and said filtrate is subjected to said step of filtration through a nanofiltration membrane and/or reverse osmosis membrane.

5. The method according to claim 4, wherein the molecular weight cutoff of said ultrafiltration membrane is not more than 50,000.

6. The method according to claim 5, wherein said saccharified liquid contains calcium.

7. The method according to claim 1, wherein said saccharified liquid contains calcium.

8. The method according to claim 1, wherein the pH of said alkali washing liquid is not less than 9.

9. The method according to claim 1, wherein said alkali washing liquid contains one or more selected from the group consisting of sodium hydroxide, potassium hydroxide, and ammonia.

10. The method according to claim 1, wherein said two-step washing step is repeatedly carried out.

11. A method of producing a sugar liquid comprising:
a step of filtering a saccharified liquid obtained by at least one selected from the group consisting of a) enzymatic saccharification of a cellulose-containing biomass pretreated by steam explosion treatment, b) hydrothermal treatment, c) acid treatment, d) alkali treatment, and e) ammonia treatment, through a nanofiltration membrane and a reverse osmosis membrane; and
a two-step washing step consisting of washing said nanofiltration membrane and said reverse osmosis membrane after said filtration, with nitric acid and then with an alkali washing liquid.

12. A method of producing a sugar liquid comprising:
a step of filtering a saccharified liquid obtained by at least one selected from the group consisting of a) enzymatic saccharification of a cellulose-containing biomass pretreated by steam explosion treatment, b) hydrothermal treatment, c) acid treatment, d) alkali treatment, and e) ammonia treatment, through a nanofiltration membrane and a reverse osmosis membrane; and
a two-step washing step consisting of washing said nanofiltration membrane after said filtration, with nitric acid and then with an alkali washing liquid.

* * * * *